Jan. 7, 1969     F. W. BOOTH     3,420,069
CONDENSER-SEPARATOR

Filed May 1, 1967     Sheet _1_ of 2

INVENTOR
FRANKLIN W. BOOTH

BY

ATTORNEYS

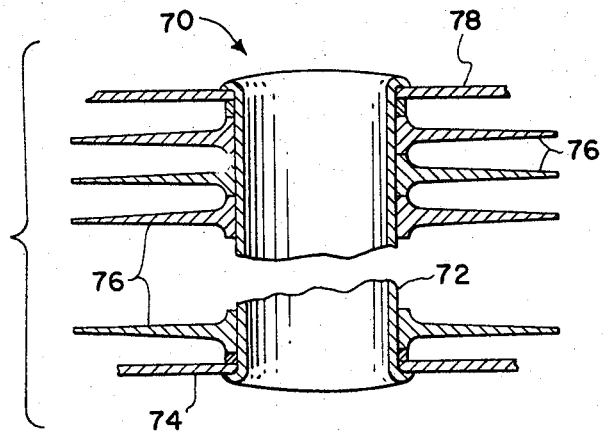
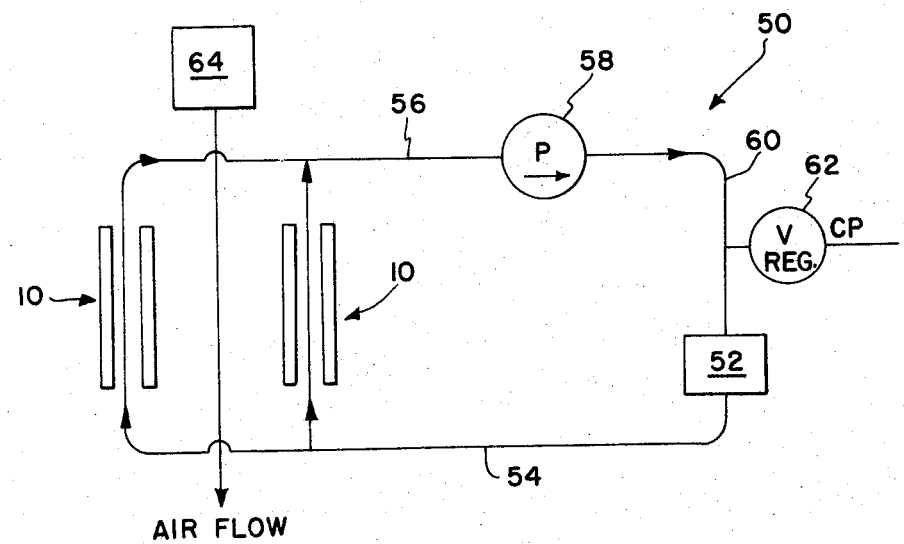
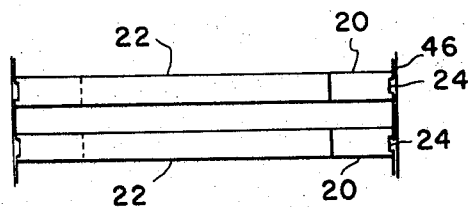

United States Patent Office 3,420,069
Patented Jan. 7, 1969

3,420,069
CONDENSER-SEPARATOR
Franklin W. Booth, Hampton, Va., assignor to the United States of America as represented by the Administrator of the National Aeronautics and Space Administration
Filed May 1, 1967, Ser. No. 635,970
U.S. Cl. 62—93                                    11 Claims
Int. Cl. F25d *17/04;* F25d *21/00*

ABSTRACT OF THE DISCLOSURE

A condenser-separator for dehumidifying air that utilizes a sintered metal surface separating a humid airstream from a coolant media of the same liquid as the condensate taken from the airstream. A system utilizing a coolant chamber having an outer surface made of sintered metal and the interior connected to the suction side of a pump that passes coolant, including condensate, past a constant pressure valve into a reservoir from which it is drawn for recirculation and cooling of the interior of the sintered metal surfaces.

---

The invention described herein was made by an employee of the United States Government and may be manufactured and used by or for the Government for governmental purposes without the payment of any royalties thereon or therefor.

This invention relates generally to a condenser and more particularly to a condenser-separator for removing condensable liquid from an airstream in either a zero or one gravity environment.

The present state of the art of phase separators or condenser-separators for liquid involved a multistep process. The first step condenses liquid from the gas or airstream with a conventional condenser coil. The condensate thus formed on the coil is blown, by the velocity of the gas stream, along the length of the condenser plates or fins. After passing across these coil fins, the condensate is blown from the trailing edge of the fins, in the form of droplets or aerosols, and thus reenters the airstream in various size droplets. The next step in the present state of the art is to pass the gas and aerosols through a mechanical device where an effort is made to separate these aerosols from the gas stream, as for example by centrifugal forces. Separation of the aerosols in the low micron size is a very difficult process and is the basis of the present difficulties encountered by life support system designers. Various other units for distillation or removal of liquid from an airstream have been devised utilizing various materials for the centrifuge bowl or the collector element. For example, it is known that utilization of a sponge or porous material on the centrifuge bowl permits collection of condensate. However, such a system requires complicated mechanical devices for removing the condensate entrained in the porous material. Furthermore, these known devices generally require a gravity environment, are cumbersome and seldom have sufficient reliability to warrant incorporation in a spacecraft.

In view of the disadvantages of the prior art, it is an object of the instant invention to provide a condenser-separator for efficiently removing liquid from an airstream without forming an aerosol.

Another object of this invention is to provide a condenser-separator for condensing liquid in an airstream and removing the condensate in a one-step process.

A further object of the instant invention is to provide a closed loop cooling system having a unique condenser-separator for condensing liquid in an airstream and exhausting the liquid in a predetermined manner.

A still further object of this invention is to provide a condenser-separator utilizing sintered metal plates having an exterior surface in contact with the airstream and an interior surface in contact with a liquid coolant of the same liquid as the condensate being formed.

Still another object of the instant invention is to provide a condenser-separator unit of the tube-fin type wherein the tubes are made of sintered metal and the fins of porous material for absorbing condensate formed thereon and causing it to flow into the tubes where it intermingles with a coolant.

Generally, the foregoing and other objects are accomplished by providing a condenser-separator unit having sintered metal wrapped about a plurality of baffles and sides or sintered metal tubes forming a chamber for flow of a coolant on the interior surface of the sintered metal such that some of the coolant liquid is entrained on the interior surface of the sintered metal and thereby provides for capillary attraction of condensate formed on the exterior surface of the chamber and in porous fins such that, due to a pressure differential between the airstream and the interior or coolant portion of the chamber, the condensate formed on the exterior surface of the condenser-separator unit flows into the coolant chamber and is pumped out of the system by a pump in line with a constant pressure valve.

A more complete appreciation of the invention and many of the attendant advantages thereof will be readily apparent as the same becomes better understood by reference to the following description when considered in connection with the accompanying drawings wherein:

FIG. 3 is an elevational sectional view taken on line 3—3 of FIG. 2;

FIG. 4 is a diagrammatic view of a partial vertical section of an alternative embodiment of the instant invention; and FIG. 5 is a diagrammatic view of a system incorporating the novel condenser-separator of FIGS. 1–3.

Figure 1:
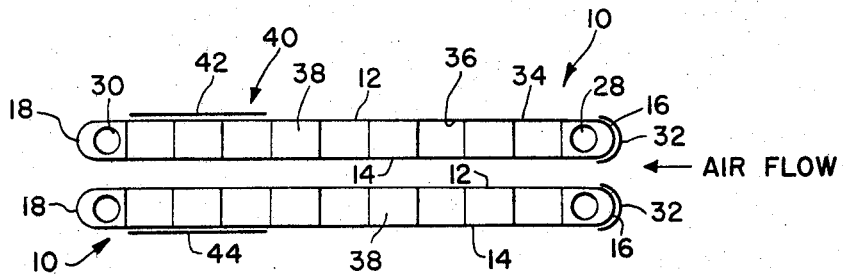
FIG. 1 is a side elevational view of a plurality of the condenser-separator units of the instant invention.

Referring now to the drawings and more particularly to FIG. 1, wherein the instant condenser-separator unit 10 is shown to have top plate 12, bottom plate 14 and end sections 16 and 18. These portions of the condenser-separator 10 are preferably made of a sintered metal having micron-sized pores as a basic characteristic. Such a material of relatively thin cross section is capable of being wrapped in the general configuration shown in FIG. 1. A plurality of baffles 20 and 22 extend respectively from sides 24 and 26 for a purpose to be described more fully hereinafter. Sides 24 and 26 are connected with the sintered metal top, bottom and ends of the condenser-separator unit in such a manner as to provide closed coolant chamber 38.

A plurality of conduit attachments are connected with the sides in order to provide outlet 28 and inlet 30 for a coolant to flow into and out of coolant chamber 10. As is readily apparent, any number of inlets and outlets may be utilized. Baffles 20 extend from side 24 a major portion of the width of chamber 38, thus leaving an area open for passages of coolant around the end of baffles 20. Baffles 22 extend from side 26 toward side 24 for a major portion of the width of coolant chamber 10 in order to cause a flow of coolant therearound, thereby providing for the liquid coolant to maintain the inner surface of top 12 and bottom 14 wet and effect entrainment of a portion of the coolant liquid due to the porous nature of the sintered metal. The characteristics of the sintered metal permit a pressure differential wherein a higher pressure is on the exterior surface of unit 10 and the coolant or interior surface of top and bottom plates 12 and 14 have a slightly lower pressure thereon. Thus, it is seen that the sintered metal top 12, FIG. 1, has a condensate or exterior surface 34 and a coolant surface 36, having entrained condensate therebetween. In order to prevent the velocity of the airstream from forcing a portion of the gas through sintered metal end 16, cap 32 is utilized for protection of end 16 and performs as a deflector to effect smooth aerodynamic flow of the airstream over top 12 and bottom 14 of unit 10.

Figure 2:
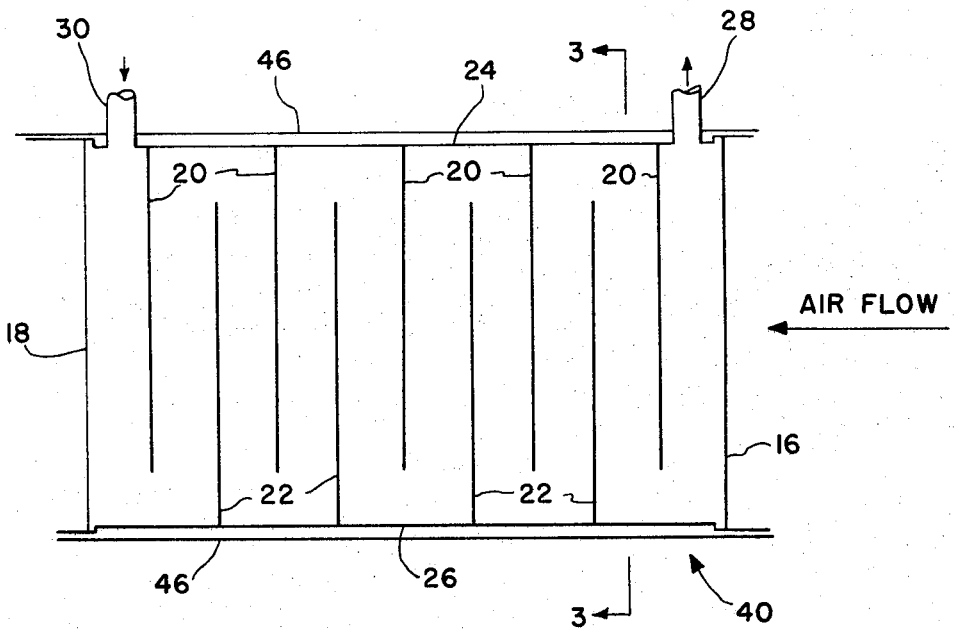
FIG. 2 is a diagrammatic top view of the novel condenser-separator unit of FIG. 1.

As is seen in FIGS. 1–3, housing 40 is utilized for support of one or a plurality of condenser-separator units 10 and restricts the volume of the airstreams such that the major portion thereof encounters the cooler surfaces of the condenser-separator unit. Housing 40 includes top 42 and bottom 44 as well as sides 46. This housing is generally of conventional construction well within the purview of the art.

An alternative embodiment of the invention is shown in FIG. 5 to include condenser-separator unit 70 having a plurality of tubes 72 extending between inlet header 74 and outlet header 78. The basic construction of such a unit is conventional. However, tubes 72 are made of sintered metal and tapered fins 76 are made of a porous material such as sintered metal, sponge or foamed plastics. Because fins 76 are porous and cooled by the coolant flowing in tubes 72, condensate is drawn by capillary attraction through fins 76 into tubes 72 without aerosols reentering the airstream.

Referring now to FIG. 4 wherein system 50 is shown diagrammatically to incorporate heat exchanger 52, of conventional construction, which functions in a well-known manner to chill the coolant to a lower temperature than that of the gas or air. It is to be noted that the coolant passing through exchanger 52 is of the same liquid as the condensate formed on the interior surfaces of coolant chamber 38. Exchanger 52 is connected to the coolant chambers by low pressuer conduit 54 that attaches to inlet 30 in units 10. The coolant flows from condenser-separator unit 10 from outlet 28 which is attached to low pressure conduit 56 connecting units 10 with the suction side of pump 58. Pump 58 and the condensate collected in coolant chamber 38 increase the pressure of the coolant media and force the high-pressure media through conduit 60 and exchanger 52. Constant pressure valve 62 inserted in conduit 60 exhausts condensate from the closed loop cooling system due to the pressure rise caused by the collected condensate. In order to accomplish movement of air across condenser units 10, circulating fan 64 is mounted in an airstream conduit, not shown, and forces the air-stream through housing 40.

*Operation*

Referring to FIG. 4, it is seen that pump 58 has its suction side connected with condenser-separator unit 10 and therefore draws the coolant liquid from heat exchanger 52 through low pressure conduit 54 into condenser-separator units 10 or 70 and then into pump 58. The coolant is discharged into high pressure conduit 60 connected with exchanger 52, thus providing a closed loop system. As noted hereabove, constant pressure valve 62 permits removal of a portion of the coolant equal to the condensation as it passes therethrough. Condenser-separator units 10 utilize condenser plates, such for example as top 12, bottom 14 and ends 16 and 18 made of sintered metal. Side 34 of these plates acts as the condensing surface and the other side 36 contains the entrained circulating coolant media of the same liquid as the condensate being formed. The surfaces of fins 76 act as the condensing surface for the embodiment of FIG. 4 and, because of their porosity, absorb the condensate and function as conduits for conveying the condensate to tubes 72. Capillary attraction draws the condensate into tubes 72 in the same manner as described with regard to the embodiment of FIGS. 1–3. Capillary attraction of the liquid in the pores of the interior side 36 of the sintered plates or the interior of tubes 72 makes it necessary to have a pressure differential between the gas side or exterior side and the liquid or interior side of the surfaces in order to cause a flow of liquid across the thickness of the plates or tubes. This pressure differential can be preset because it is on the suction side of circulating pump 58. The coolant liquid enters condenser-separator units 10 and 70 through inlet 30 or header 74 and flows around baffles 20 and 22 or through tubes 72 and exits through outlet 28 or header 78 which is connected with low pressure conduit 56. As the airstream flows across exterior surface 34 or fins 76 of the condenser-separator units, condensate is formed thereon and, because of the pressure differential and capillary attraction, flows through the plate or fins and tubes to enter the closed circulating media system where it assists in causing an increase in pressure on the discharge side of pump 58. The condensate is subsequently bled off by constant pressure valve 62. Because the sintered metal plates for top 12 and bottom 14, as well as ends 16 and 18 or tubes 72, are continuously wet on the cooling media or interior side, air leakage is eliminated.

Thus, it is seen that the instant invention provides a unique system for a one-step process of dehumidifying an airstream by utilizing sintered metal plates or tubes for drawing condensate therethrough to intermingle with the coolant. The instant inventive system prevents the formation of aerosols with their resultant difficulties of removal and prevents the entrapment of air in the liquid condensate stream which could cause further separation problems. The high pressure side of the circulation media pump causes pressures high enough to permit solid liquid to be emitted from the constant pressure valve. Thus, it is seen that the instant invention provides a highly reliable and efficient condenser-separator for dehumidifying an airstream in both a one-gravity and zero-gravity environment.

Obivously many modifications and variations of the subject invention are possible in the light of the above teachings. It is therefore to be understool that within the scope of the appended claims the invention may be practiced otherwise than as specifically described.

What is claimed as new and desired to be secured by Letters Patent of the United States is:

1. In a condenser-separator for removing a liquid entrained in a gas the combination comprising:

a chamber, having at least a portion of its walls constructed of a porous material;

a liquid in said chamber wetting said porous portion;

means for passing said gas mixture over said porous portion;

means controlling the pressure of said liquid at a level less than that of said gas, whereby liquid entrained in said gas contacting said porous portion is drawn into said chamber while said gas is excluded.

2. The condenser-separator of claim 1 wherein said chamber comprises a plurality of sintered metal coolant tubes; said tubes extending between an inlet and outlet header; and a plurality of tapered fins of a porous material mounted on said tubes in spaced relationship, whereby coolant flowing through said tubes cools them and said fins upon which condensate is formed and by which condensate is conveyed to said tubes to be intermingled with the coolant.

3. The condenser-separator of claim 1 further comprising a plurality of baffles extending substantially the greater portion of the distance from one side to the other of the interior of said chamber for insuring liquid flow over substantially the complete interior surfaces of said chamber.

4. The condenser-separator of claim 1 wherein said chamber includes a top, bottom, and ends of sintered metal;

and further including cap means for protection of the portion of said chamber directed into the flow of gas passing over the exterior of said chamber.

5. The condenser-separator of claim 4 including a plurality of said chambers mounted in juxtaposition to one another; and housing means for containing said plurality of chambers, whereby said gas flowing through said housing flows across said sintered metal tops and bottoms of said chambers and liquid is condensed therefrom and said gas discharges from said housing in a substantially dry state.

6. The condenser-separator of claim 1 further comprising:

pump means for effecting liquid flow through said chamber; and said pressure control means includes valve means connected with said pump means by a pump means by a conduit for pressure-relief bleed-off of condensate; and said cooling means includes a heat exchanger means connected with said pump means and chamber to maintain a constant flow of liquid through said chamber, whereby condensate flowing through said sintered metal surfaces intermingles with the liquid and is pumped to said heat exchanger means after a portion of the condensate is removed from the system by said valve means.

7. The condenser-separator of claim 1 further including means for cooling the temperature of said porous portion below that of the gas, whereby condensate may be obtained directly out of said gas and collected in said chamber.

8. The combination of claim 1 wherein a liquid of the same composition as that in the mixture is enclosed in said chamber.

9. A method of separating a mixture of a gas and a liquid comprising: enclosing a liquid in a container having a porous portion passing a mixture of a gas and a liquid about said porous portion; maintaining the pressure on the liquid side of said portion at a lower pressure than that of the mixture, whereby the liquid in said mixture may pass through said pores but the gas is excluded by the capillary entrainment of said liquid within said porous portion.

10. The method of claim 9 further including the step of cooling the porous portion of the container below the temperature of the gas whereby vapor forms of the liquid in said mixture may be condensed and collected in a single step.

11. A separator for separating a mixture of a liquid and a gas comprising:
a body of liquid;
first means for bringing a liquid and gas mixture into proximity with said liquid;
second means separating said liquid and said mixture including a porous barrier wetted by said liquid and brought into contact with said mixture by said first means;
means for controlling the pressure differential between said liquid and said mixture so that the pressure in said liquid is less than that in said mixture.

References Cited

UNITED STATES PATENTS

| | | | |
|---|---|---|---|
| 3,170,303 | 2/1965 | Rannenberg | 62—64 |
| 3,197,973 | 8/1965 | Rannenberg | 62—268 |
| 3,212,286 | 10/1965 | Curtis | 62—304 |
| 3,304,696 | 2/1967 | McKenna | 62—93 |
| 3,359,753 | 12/1967 | Fiedler | 62—93 |

WILLIAM J. WYE, *Primary Examiner.*

U.S. Cl. X.R.

62—268, 304, 272; 55—16, 267; 62—281